United States Patent [19]

Van Grinsven

[11] 3,832,416

[45] Aug. 27, 1974

[54] PROCESS FOR THE REMOVAL OF CYCLOPENTADIENE FROM HYDROCARBON MIXTURES

[75] Inventor: Petrus F. A. Van Grinsven, Amsterdam, Netherlands

[73] Assignee: Shell Oil Company, New York, N.Y.

[22] Filed: July 16, 1973

[21] Appl. No.: 379,271

[30] Foreign Application Priority Data
July 17, 1972 Netherlands ...................... 7209848

[52] U.S. Cl. .......................................... 260/681.5 R
[51] Int. Cl. ............................................. C07c 7/12
[58] Field of Search .................................. 260/681.5

[56] References Cited
UNITED STATES PATENTS

| | | | |
|---|---|---|---|
| 2,900,430 | 8/1959 | Henke et al.................. | 260/681.5 R |
| 2,935,540 | 5/1960 | Wolfe........................... | 260/681.5 R |
| 3,311,671 | 3/1967 | Baker........................... | 260/681.5 R |
| 3,492,366 | 1/1970 | Winter.......................... | 260/681.5 R |

*Primary Examiner*—Veronica O'Keefe
*Attorney, Agent, or Firm*—Ronald R. Reper

[57] ABSTRACT

A process for the removal of cyclopentadiene from a hydrocarbon mixture containing isoprene comprising contacting said hydrocarbon mixture with dehydrated molecular sieve material containing at least one alkali metal and having a pore diameter of more than 0.6 nanometers (nm).

8 Claims, No Drawings

PROCESS FOR THE REMOVAL OF CYCLOPENTADIENE FROM HYDROCARBON MIXTURES

BACKGROUND OF THE INVENTION

The invention relates to a process for the removal of cyclopentadiene from a hydrocarbon mixture containing isoprene.

Cracking processes, e.g., of mineral oil fractions, such as naphtha, gas oil and paraffin wax for the preparation of ethylene, in addition to ethylene, result in considerable quantities of olefinically unsaturated compounds having more than two carbon atoms and aromatic compounds are formed. Considerable quantities of isoprene occur in the hydrocarbon fraction having predominantly five carbon atoms; which isoprene may be employed, e.g., in the preparation of synthetic rubbers by polymerization. In addition to isoprene, however, said $C_5$ fraction contains a number of compounds which have an inhibiting effect on the polymerization of isoprene (particularly when using alkyl lithium compounds as initiator), so that in order to polymerize the isoprene present in these hydrocarbon mixtures to high molecular weight elastomers, it is necessary to first remove the substances which have an inhibiting effect on the polymerization, or to convert them to inert products. One of the compounds which have an inhibiting effect on the polymerization of isoprene often present in the hydrocarbon mixtures is cyclopentadiene.

As much as possible of the undesirable compounds will generally be removed by means of distillation. However, because the boiling points of the $C_5$ hydrocarbons are very close, it is necessary to carry out distillation in columns having a very large number of trays in order to achieve an adequate degree of separation. Such a distillation is technically and economically unattractive.

It is also possible to remove cyclopentadiene from hydrocarbon mixtures by thermal dimerization and separation of the dimerized product from other hydrocarbons, such as isoprene, by means of distillation. However, dimerization takes a long time to decrease the amount of cyclopentadiene to the very low concentrations permissible for isoprene polymerization, and still requires separation by distillation. Moreover, the resultant cyclopentadiene dimers are of little commercial value.

It is known from U.S. Pat. No. 2,900,430 to separate straight chain acetylenes from isoprene with molecular sieves having a pore diameter of 0.5 angstroms.

SUMMARY OF THE INVENTION

A process has now been found for removing cyclopentadiene from hydrocarbon mixtures by means of molecular sieve material. The process is especially suitable when the cyclopentadiene content of the hydrocarbon mixtures is low and the above-described methods are not attractive because of the said technical difficulties.

According to the invention the hydrocarbon mixture containing isoprene is contacted with dehydrated molecular sieve material loaded with at least one alkali metal and having a pore diameter of more than 0.6 nm.

DESCRIPTION OF THE PREFERRED EMBODIMENT

It is preferable to use as starting materials hydrocarbon mixtures which contain at least 5 percent by weight of isoprene. Thus, a very suitable starting material is a fraction which consists substantially of hydrocarbons having five carbon atoms, obtained from the hydrocarbon mixture produced by steam cracking or pyrolysis of gas oil or naphtha for the preparation of ethylene, which fraction contains 10–20 percent by weight of cyclopentadiene.

If desired, a portion of the cyclopentadiene can be removed in a known manner, for example by thermal dimerization of the cyclopentadiene and separation by distillation of the dimers formed and the other hydrocarbons prior to the application of the process according to the invention. It is also possible to distill a mixture of isoprene and cyclopentadiene (obtained, for example, by extraction of a technical mixture of hydrocarbons with sulfolane) to achieve a certain degree of separation and subsequently to remove the rest of the cyclopentadiene still present in the isoprene in accordance with the process according to the invention. If a portion of the cyclopentadiene is first removed by means of known processes, the quantity removed must be selected in such a way that the known process in question is still technically and economically attractive.

The term "molecular sieve material" herein denotes zeolites. The zeolites are a group of naturally occurring, or synthetically prepared, crystalline hydrated metal alumina silicates, which can be represented by the general formula:

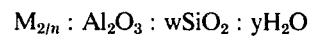

$$M_{2/n} : Al_2O_3 : wSiO_2 : yH_2O$$

in which M is a metal, n is the valency of this metal, w is the number of mols of $SiO_2$ (at least 2) and y is the number of mols of water. The zeolites vary with respect to their crystal structure and composition. With regard to their structure they are composed of a three-dimensional network of $SiO_4$ — and $AlO_4$ — tetrahedrons which are interconnected by common oxygen atoms. The negative electron valence of the tetrahedrons containing aluminum is balanced by the inclusion in the crystal of the cations of the metals M, for example alkali metal cations or alkaline earth metal cations. These cations may be replaced by others, using suitable exchange methods.

The crystal structure of the zeolites contains open spaces of molecular dimensions which are normally filled with water of hydration. After at least partial dehydration these zeolites can be used as efficient adsorbants, whereby the adsorbed molecules are retained within the open spaces. These open spaces are accessible via openings in the crystal structure. Depending on the cross-sectional area of these openings in a zeolite fully loaded with sodium is termed pore diameter in the specification and the appended claims. Pore diameters can be determined on the basis of the crystal structure.

Both natural and synthetic zeolites are extensively described in the literature, for example in Revue de l'Institut Francais du Petrol, 26 (1969), 657–677.

The molecular sieve material to be used in the process according to the invention must be loaded with at least one alkali metal, i.e., at least some of the atoms designated by M in the given formula consist of alkali metal atoms. Although some of the atoms designated by M may consist of divalent or polyvalent atoms (for example calcium), preference is given to molecular sieve material which contains as metals only alkali metals in addition to aluminum, since in the presence of divalent or polyvalent cations there is a risk of polymerization of unsaturated compounds.

Of the alkali metals lithium, sodium, potassium, rubidium and cesium, cesium is preferred because the most attractive removal of cyclopentadiene is obtained with molecular sieve material loaded with this alkali metal, especially when the hydrocarbon mixture contains less than 5 percent by weight of cyclopentadiene. A very suitable molecular sieve material is that of which the cesium load factor is at least 25 atomic percent, based on the number of aluminum atoms present in the molecular sieve material.

In natural and synthetic zeolites M generally consists completely or substantially completely of sodium. In order to load the molecular sieve material with a desired metal, at least a portion of this sodium (or any other metals present as cations) must be replaced by the desired metal. This is suitably achieved by ion exchange, for example by contacting the molecular sieve material, which is for instance completely loaded with sodium, with an aqueous solution of a salt of the desired metal. Salts include, for example, nitrates, halides, citrates, carbonates, sulfates and the like.

In order to obtain good removal of the cyclopentadiene from the hydrocarbon mixture, it is important that the molecular sieve material to be used in the process according to the invention contains no water or as little water as possible. For this reason, the molecular sieve material loaded with the desired metal (or the desired metals) is activated by dehydration. Heating to temperatures between 200° and 500°C in an inert gas atmosphere (e.g., nitrogen) for a period of 4–8 hours, for example, is very suitable for this purpose. In order to maintain the activity of the molecular sieve material to be used in the process according to the invention at a high level for as long as possible, it is advisable to ensure that the hydrocarbon mixture to be treated contains no water or substantially no water. This can be achieved by first drying this mixture in any conventional manner, for example, by means of suitable molecular sieves.

The pore diameter of the molecular sieve material loaded with one or more alkali metals, according to the invention must be more than 0.6 nm and is preferably in the range of 0.8 to 1.3 nm. Very suitable molecular sieve materials are mordenite, offretite, zeolite L, zeolite-omega and in particular faujasite.

The amount of $SiO_2$ present in the molecular sieve material may vary between wide limits without having any great influence on the suitability of the material for the removal of cyclopentadiene from hydrocarbon mixtures containing isoprene. The value of $w$ in the given formula is very suitably between 2 and approximately 6.

The hydrocarbon mixture may be contacted with the molecular sieve material in the vapor or liquid phase. The temperature may be selected within a wide range. A temperature is preferably selected between 0° and 100°C; above 100°C there is the risk of polymerization of isoprene, whereas cooling of the hydrocarbon mixture to temperatures below 0°C is often difficult.

The process according to the invention is very suitably conducted by percolating the hydrocarbon mixture through a column packed with molecular sieve material which is loaded with one or more alkali metals and which has a pore diameter of more than 0.6 nm.

The molecular sieve material may be used in any form which permits good contact with the hydrocarbon mixture to be treated, for example in the form of powders, pills, granules, cylinders, tablets, etc. In technical applications, for example in a column, use will generally be made of somewhat larger particles than in laboratory runs. Molecular sieve material with particle diameters between 1 and 0.5 mm are very suitable for packing a column.

After having contacted the hydrocarbon mixture with the molecular sieve material for a certain time, the capacity to remove cyclopentadiene declines and the cyclopentadiene taken up or adsorbed in the sieve material must be removed therefrom. This removal is very suitably carried out by treatment of the molecular sieve material with a desorbant. Aromatic compounds (such as benzene), alcohols and ketones (such as acetone) are very suitable for this purpose.

After the desorption of the cyclopentadiene the molecular sieve material can once again be contacted with the hydrocarbon mixture. If desired, the desorbant can first be removed from the molecular sieve material, for example by treatment with an inert gas, such as nitrogen.

If desired, a hydrocarbon mixture obtained by means of the process according to the invention, which is completely or substantially completely freed of cyclopentadiene, may be subjected to further treatment in order to remove compounds which could interfere with the polymerization of isoprene by any known process such as e.g., treatment with metallic sodium.

EXAMPLE I

For the exchange of sodium ions for other alkali metal ions a 0.25 molar aqueous solution of the nitrate of the desired metal(s) was percolated through a column which had been completely packed with sodium-loaded faujasite. The faujasite loaded with the desired metals was then dehydrated by heating to 400°C, while nitrogen was bubbled through for 4 hours. If an insufficient quantity of the desired metal was adsorbed, the whole process was repeated. The faujasites used were faujasite X (molar ratio $SiO_2/Al_2O_3 = 2.6$) and faujasite Y (molar ratio $SiO_2/Al_2O_3 = 5$), both with a pore diameter of approximately 1 nm.

EXAMPLE II

A vertical tubular reactor with a volume of 26 ml was packed with the molecular sieve material to be investigated having a grain size of 16–40 mesh (grain diameter approx. 1–0.4 mm), and a sufficient amount of a liquid mixture of 50 parts by weight of isoprene and 50 parts by weight of cyclopentadiene was subsequently added so that the molecular sieve material was completely covered (approximately 22 ml). The mixture was kept at 5°C for 30 minutes, whereupon the liquid which had not been adsorbed was expelled by means of iso-octane. The adsorbed hydrobarbon mixture was then desorbed by means of benzene. The amounts of isoprene and cyclopentadiene in the adsorbed and nonadsorbed liquid were determined by gas chromatography. The results were used to calculate the selectivity, defined as the ratio of the quantity of adsorbed cyclopentadiene/the quantity of non-adsorbed isoprene to the quantity of non-adsorbed cyclopentadiene/the quantity of non-adsorbed isoprene The higher the selectivity, the greater the preference for the adsorption of cyclopentadiene from the hydrocarbon mixture to the sieve material. Tables A and B give the results for, respectively, faujasite X and faujasite Y as molecular sieve material used for the ion exchange in loading with the desired alkali metal.

Table A

| | Basic sieve material: faujasite X | |
|---|---|---|
| Alkali metal other than Na | Mol. % alkali metal other than Na (based on total alkali metal) | Selectivity |
| Li | 55 | 2.57 |
| — | — | 1.60 |
| K | 90 | 2.77 |
| Rb | 65 | 2.78 |
| Cs | 68 | 2.90 |

Table B

| | Basic sieve material: faujasite Y | |
|---|---|---|
| Alkali metal other than Na | Mol. % alkali metal other than Na (based on total alkali metal) | Selectivity |
| Li | 55 | 2.57 |
| — | — | 3.16 |
| K | 97 | 2.46 |
| Rb | 72 | 2.63 |
| Cs | 70 | 3.67 |

EXAMPLE III

The experiments described in Example II were repeated, using in place of the 50/50 cyclopentadiene-isoprene mixture a mixture of 44.0 percent by weight of isoprene, 2.1 percent by weight of cyclopentadiene and 53.9 percent by weight of n-heptane. N-heptane is an inert diluent.

The results are summarized in Tables C and D.

Table C

| | Basic sieve material: faujasite X | |
|---|---|---|
| Alkali metal other than Na | Mol. % alkali metal other than Na (based on total alkali metal) | Selectivity |
| Li | 65 | 4.46 |
| — | — | 4.56 |
| K | 90 | 13.0 |
| Rb | 65 | 34.6 |
| Cs | 68 | 38.7 |

Table D

| | Basic sieve material: faujasite Y | |
|---|---|---|
| Alkali metal other than Na | Mol. % alkali metal other than Na (based on total alkali metal) | Selectivity |
| Li | 55 | 3.82 |
| — | — | 12.05 |
| K | 97 | 6.62 |
| Rb | 72 | 10.5 |
| Cs | 70 | 13.8 |

EXAMPLE IV

A gaseous mixture of 93 parts by weight of isoprene and 7 parts by weight of cyclopentadiene was passed in the gas phase at room temperature and at a pressure of 15 cm Hg over a faujasite X sieve, of which 65 mol. percent of the sodium had been exchanged for cesium. The molecular sieve material had been saturated in advance with n-pentane, in order to avoid a sharp temperature rise during the adsorption of the unsaturated compounds.

The passage of the gas mixture was stopped when the composition of the effluent stream was the same as that of the feed. The adsorbed mixture was subsequently desorbed by means of acetone, and was analyzed. The selectivity for the adsorption of cyclopentadiene was 13.1.

What is claimed is:

1. A process for the removal of cyclopentadiene from a $C_5$ hydrocarbon mixture containing isoprene wherein the hydrocarbon mixture containing at least 5 percent by weight isoprene is contacted with dehydrated molecular sieve material loaded with at least one alkali metal and having a pore diameter in the range of 0.8 to 1.3 nm.

2. A process as in claim 1 wherein the molecular sieve material contains only alkali metals in addition to aluminum.

3. A process as in claim 1 wherein the molecular sieve material is loaded with cesium.

4. A process as in claim 3, wherein the molecular sieve material is loaded with cesium to an extent of at least 25 atomic percent, based on the number of aluminum atoms present in the molecular sieve material.

5. A process as in claim 1 wherein the molar ratio of $SiO_2 : Al_2O_3$ in the molecular sieve material is from 2 to 6.

6. A process as in claim 1 wherein the molecular sieve material is faujasite.

7. A process as in claim 1 wherein the molecular sieve material loaded with at least one alkali metals is dehydrated by heating to temperatures between 200° and 500°C in an inert gas atmosphere for a period of 4 to 8 hours.

8. A process as in claim 1 wherein the hydrocarbon mixture is contacted with the molecular sieve material at a temperature between 0° and 100° C.

* * * * *